(12) United States Patent
Max et al.

(10) Patent No.: US 11,740,079 B2
(45) Date of Patent: Aug. 29, 2023

(54) METHOD, COMPUTER PROGRAM AND DEVICE FOR DETERMINING A VEHICLE SPACING FOR AN OBSERVATION PERIOD

(71) Applicant: Volkswagen Aktiengesellschaft, Wolfsburg (DE)

(72) Inventors: Stephan Max, Gifhorn (DE); Martin Wegner, Braunschweig (DE); Sabina Alazzawi, Munich (DE); Richard Niestroj, Munich (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 473 days.

(21) Appl. No.: 16/910,693

(22) Filed: Jun. 24, 2020

(65) Prior Publication Data

US 2020/0408517 A1   Dec. 31, 2020

(30) Foreign Application Priority Data

Jun. 28, 2019 (DE) .................. 10 2019 209 481.3

(51) Int. Cl.
| | |
|---|---|
| *G01C 3/00* | (2006.01) |
| *G07C 5/08* | (2006.01) |
| *G08G 1/01* | (2006.01) |
| *G07C 5/00* | (2006.01) |

(52) U.S. Cl.
CPC .............. *G01C 3/00* (2013.01); *G07C 5/008* (2013.01); *G07C 5/0808* (2013.01); *G07C 5/0841* (2013.01); *G08G 1/0112* (2013.01); *G08G 1/0133* (2013.01)

(58) Field of Classification Search
CPC ........................................ G01C 3/00
USPC ........................................ 702/159
See application file for complete search history.

(56) References Cited

U.S. PATENT DOCUMENTS

| | | | |
|---|---|---|---|
| 6,493,625 B2 | 12/2002 | Andreas et al. | ............... 701/96 |
| 2006/0115113 A1 | 6/2006 | Lages et al. | ................. 382/183 |
| 2015/0284010 A1* | 10/2015 | Beardsley | ........ G08G 1/096816 701/1 |
| 2018/0012085 A1* | 1/2018 | Blayvas | .............. G06F 18/2414 |

(Continued)

FOREIGN PATENT DOCUMENTS

| | | | | |
|---|---|---|---|---|
| DE | 10006403 A1 | 8/2001 | ............ | B60K 31/00 |
| DE | 10258794 A1 | 6/2004 | ............ | G01S 17/93 |

(Continued)

*Primary Examiner* — Ricky Go
(74) *Attorney, Agent, or Firm* — Slayden Grubert Beard PLLC

(57) ABSTRACT

The present invention relates to a method, to a computer program comprising instructions and to a device for determining a vehicle spacing for an observation period. The invention also relates to a motor vehicle and to a back end, in which a method according to the invention, or device according to the invention, is used. In a first step, measurement values relating to an average vehicle spacing for a plurality of measurement times are received. These values may be stored for later use. The situation may arise in which an unusable measurement value is identified at an error time. In this case, a vehicle spacing for a current observation period that contains the error time is determined based on a vehicle spacing determined from the recorded measurement values for a previous observation period.

17 Claims, 3 Drawing Sheets

(56) References Cited

U.S. PATENT DOCUMENTS

2018/0173895 A1    6/2018  Max et al.
2019/0073783 A1*   3/2019  Stein .......................... G06T 7/55
2019/0302761 A1*  10/2019  Huang ................. G05D 1/0221
2021/0310816 A1*  10/2021  Okazaki ............. G01C 21/3415

FOREIGN PATENT DOCUMENTS

| DE | 102011106295 A1 | 1/2012 | ............... G08G 1/01 |
| DE | 102015213393 A1 | 1/2017 | ............... G08G 1/01 |
| DE | 102016225287 A1 | 6/2018 | ............... G08G 1/01 |
| DE | 102018006281 A1 | 2/2019 | ............. G06F 21/62 |
| EP | 3168639 A1 | 5/2017 | ............. G01S 13/52 |

* cited by examiner

METHOD, COMPUTER PROGRAM AND DEVICE FOR DETERMINING A VEHICLE SPACING FOR AN OBSERVATION PERIOD

CROSS-REFERENCE TO RELATED APPLICATIONS

This application claims priority to German Patent Application No. DE 10 2019 209 481.3, filed on Jun. 28, 2019 with the German Patent and Trademark Office. The contents of the aforesaid Patent Application are incorporated herein for all purposes.

TECHNICAL FIELD

The present invention relates to a method, to a computer program comprising instructions and to a device for determining a vehicle spacing for an observation period. The invention also relates to a motor vehicle and to a back end, in which a method according to the invention, or device according to the invention, is used.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In modern motor vehicles, a wide range of data is collected. As vehicles become increasingly interconnected, there is an interest in using data collected by the vehicle for further evaluation. For this purpose, data can be extracted from the motor vehicle and supplied to a back end. For example, data from vehicle sensors can be extracted in a location- and time-specific manner for applications relating to weather forecasts, parking lot occupancy and traffic flow data. In the back end, the data are then combined with other data on a map and fed back to the functions using the data.

An important application for data gathering is the creation of a database for anonymized swarm data for researching, developing and securing automatic driving functions. The requirement for highly automated vehicles is to manage a plethora of different and sometimes complex road traffic scenarios in an accident-free manner. Since most of these scenarios arise only rarely, testing in real road traffic is both time- and cost-intensive. For the development of automatic driving functions up to series-production readiness, a substantial database is required for securing the algorithms, which can no longer be achieved through classic test drives via endurance testing. This requires a data pool comprising data from as wide a variety of challenging traffic situations as possible, ideally taken from real journeys, by means of which the algorithms can be trained and continuously improved such that the vehicles can make appropriate decisions and act safely in all possible road traffic situations.

However, the data taken from a vehicle may allow for inference of personal or material circumstances of a particular or at least definable natural person, for example the driver of the motor vehicle.

As per current applicable data protection legislation, such collection and use of data is in general only possible with a declaration of consent from the person concerned. Although consumers today are wholly familiar with accepting terms of use and granting approval for data evaluation in the field of software in particular, this is not common in the automotive sector. It is therefore not always easy to obtain a declaration of consent to use the data. In addition, a new declaration of consent may have to be obtained from the user for the purposes of software updates, which can be a nuisance for the user in the long run.

In order to ensure data protection, the data may be subjected to different anonymization procedures. The aim of such anonymization procedures is to conceal the identity of the data originator in an anonymization group.

Against this background, DE 10 2011 106 295 A1 describes a method for bidirectional transmission of data between motor vehicles and a service provider. In the method, traffic data that describe a traffic state and that come from the motor vehicles are made available to a service provider. This is done exclusively via a back-end server device operated by a security operator. The traffic data are anonymized by means of the back-end server device prior to transmission to the service provider.

Another method for anonymous provision of vehicle data is described in DE 10 2015 213 393 A1. In the method, original vehicle data that specify covered route sections of a travel route traveled by a motor vehicle and the time range in which the route sections were covered are made available. In addition, false vehicle data that specify at least one other false travel route are generated. The false travel route may be a temporally shifted version of an actually covered route section. The original vehicle data and the false vehicle data are finally transmitted.

In another anonymization approach, the data relating to location and time are obfuscated. In this case, the data are randomly shifted in time or space additively. This way, it is only possible to identify the original vehicle in connection with a group of vehicles.

Related to this, DE 10 2016 225 287 A1 describes a method for processing data recorded by a motor vehicle. In a first step, a datum recorded by a motor vehicle is received. Subsequently, spatial or temporal obfuscation is applied to the received datum. The obfuscated datum is finally passed on for evaluation. The received datum may be obfuscated inside the motor vehicle or in a receiver system connected to the motor vehicle.

DE 10 2018 006 281 A1 describes a method for operating an assistance system of a vehicle. In the method, objects in the surroundings of the vehicle are detected. A system action is triggered in connection with a detected object if an entry that relates to the object and that marks the system action as authorized is contained in a database. The data are then anonymized by removing identification data and carrying out spatial obfuscation.

The obfuscation of the data with regard to location and time by means of additive shifts is well suited for concealing the identity of the data originator within an anonymization group. The degree of additive obfuscation strongly depends on the current volume of traffic. A high traffic density results in a small shift, whereas a low traffic density results in a large shift.

The data on the vehicle surroundings recorded by the vehicle sensor system and extracted is used to determine the traffic density. However, the vehicle sensor system is spatially restricted in its observation of the surroundings. Consequently, the previous methods for calculating the traffic density and thus for determining the degree of additive obfuscation are restricted to the surroundings of the vehicle. This in turn typically results in a higher degree of obfuscation, since too low a traffic density is identified, and thus impairs the quality of the desired functions.

SUMMARY

An object is to provide solutions for determining a vehicle spacing for an observation period, in which solutions the negative effects of the spatial restriction of the observation of the vehicle surroundings are reduced.

This object is solved by a method, by a computer program, and by a device according to the independent claims. Some embodiments of the present aspect are described in the dependent claims and the following description.

In one exemplary aspect, a method for determining a vehicle spacing for an observation period is provided. The method comprising the steps of:
receiving measurement values relating to an average vehicle spacing for a plurality of measurement times;
identifying an unusable measurement value at an error time; and
determining a vehicle spacing for a current observation period, which contains the error time, based on a vehicle spacing determined from the recorded measurement values for a previous observation period.

The details of one or more embodiments are set forth in the accompanying drawings and the description below. Other features will be apparent from the description, drawings, and from the claims.

DESCRIPTION

Figure 1:
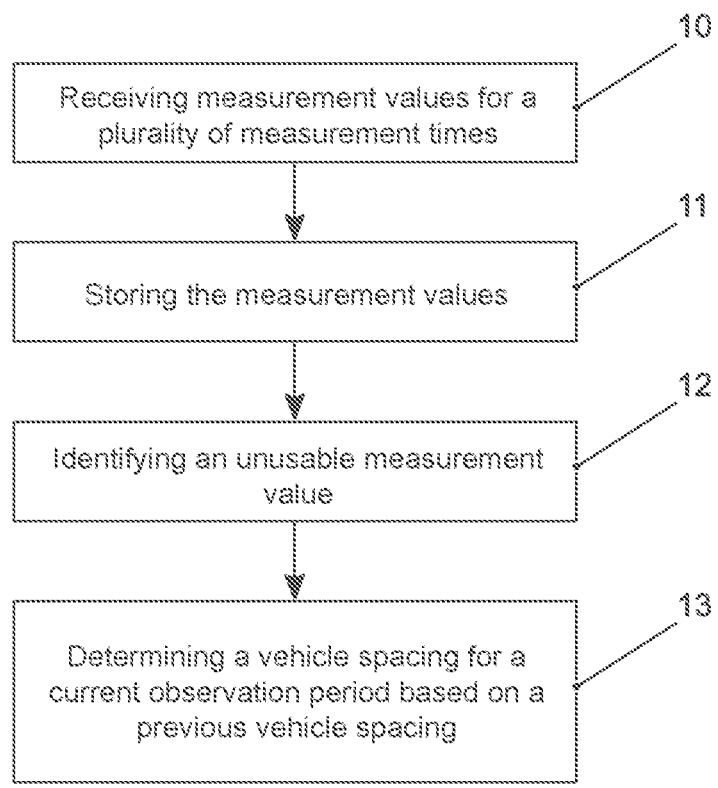
FIG. 1 schematically shows an embodiment of a method for determining a vehicle spacing for an observation period.

Specific embodiments of the invention are described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

According to a first exemplary aspect, a method for determining a vehicle spacing for an observation period comprises the steps of:
receiving measurement values relating to an average vehicle spacing for a plurality of measurement times;
identifying an unusable measurement value at an error time; and
determining a vehicle spacing for a current observation period, which contains the error time, based on a vehicle spacing determined from the recorded measurement values for a previous observation period.

According to another exemplary aspect, a computer program contains instructions that, when executed by a computer, cause the computer to execute the following steps for determining a vehicle spacing for an observation period:
receiving measurement values relating to an average vehicle spacing for a plurality of measurement times;
identifying an unusable measurement value at an error time; and
determining a vehicle spacing for a current observation period, which contains the error time, based on a vehicle spacing determined from the recorded measurement values for a previous observation period.

The term "computer" is to be interpreted broadly. In particular, it also comprises controllers, workstations and other processor-based data processing devices.

The computer program may for example be made available for electronic retrieval or stored on a computer-readable memory medium.

According to another exemplary aspect, a device for determining a vehicle spacing for an observation period comprises:
an input for receiving measurement values relating to an average vehicle spacing for a plurality of measurement times;
evaluation circuitry for identifying an unusable measurement value at an error time; and
a processing circuitry for determining a vehicle spacing for a current observation period, which contains the error time, based on a vehicle spacing determined from the recorded measurement values for a previous observation period.

The solution according to the teachings herein follows the approach of performing a calculation of the vehicle spacing for the current observation period based on statistical assumptions in the event of unusable measurement values. A vehicle spacing determined for a previous observation period is used for this purpose and extrapolated to the current observation period. Unusable measurement values are for example incorrect or missing measurement values or an infinite average vehicle spacing.

Typically, the measurement values are recorded by means of a sensor system of the motor vehicle, which has a finite detection range. By means of the solution according to the present teachings, it is possible to determine a traffic density of greater than zero even if there are no longer any vehicles within the detection range at a given measurement time. As a result, the vehicle data can be anonymized without or with less devaluation of target data or target functionalities.

In some embodiments, a ratio of a duration of the current observation period to a duration of the previous observation period is taken into consideration during determination of the vehicle spacing for the current observation period. For this purpose, the vehicle spacing determined for the previous observation period is for example scaled proportionally to the ratio of the duration of the current observation period to the duration of the previous observation period. By taking into consideration the quotient of the durations of the observation periods, it is ensured that a vehicle spacing that is greater than the previously determined vehicle spacing is always calculated in the event of unusable measurement values. If the previously determined vehicle spacing is scaled proportionally to the quotient, the calculated vehicle spacing will be larger the longer there are no usable measurement values. This therefore accounts for a situation in which the calculated vehicle spacing becomes increasingly unreliable during longer absences of usable measurement values.

In some embodiments, the current observation period and the previous observation period have the same start time. For example, this start time may be adjusted. This way, it is possible to ascertain how long the previous observation period that should be considered for the determination of the vehicle spacing should be, i.e., which measurement values should be used. This makes it possible to account for the variability of the traffic situation, which differs depending on the time of day or the route traveled.

A method or a device according to the present discussion may for example be used in an autonomously or manually controlled vehicle, such as a motor vehicle. In some embodiments, the solution of the present discussion may be used in a back end to which the data are transmitted from the vehicle.

Further features will become apparent from the following description and the appended claims in conjunction with the FIGS.

In order to better understand the principles of the present invention, further embodiments are explained in greater detail below based on the FIGS. It should be understood that the invention is not limited to these embodiments and that the features described can also be combined or modified without departing from the scope of protection of the invention as defined in the appended claims.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 schematically shows a method for determining a vehicle spacing for an observation period. In a first step, measurement values relating to an average vehicle spacing for a plurality of measurement times are received 10. These values may be stored 11 for later use. For example, the measurement values are recorded by means of a sensor system of a motor vehicle. The situation may arise in which an unusable measurement value is identified 12 at an error time. In this case, a vehicle spacing for a current observation period that contains the error time is determined 13 based on a vehicle spacing determined from the recorded measurement values for a previous observation period. In the process, a ratio of a duration of the current observation period to a duration of the previous observation period may be taken into consideration. For example, the vehicle spacing determined for the previous observation period is scaled proportionally to said ratio. The current observation period and the previous observation period may have the same start time. This may additionally be adjustable.

Figure 2:
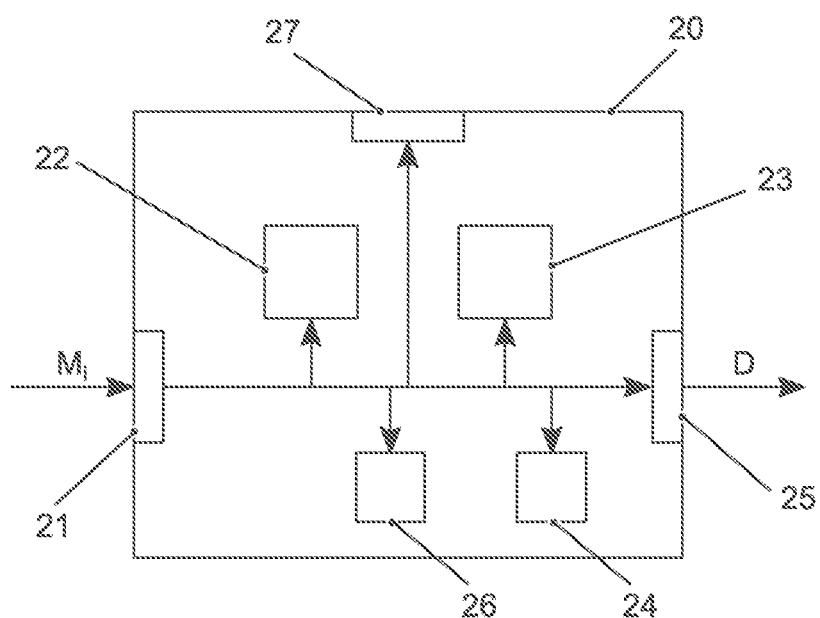
FIG. 2 shows a first embodiment of a device for determining a vehicle spacing for an observation period.

FIG. 2 shows a simplified schematic representation of a first embodiment of a device 20 for determining a vehicle spacing for an observation period. The device 20 comprises an input 21 for receiving measurement values $M_i$ relating to an average vehicle spacing for a plurality of measurement times. For example, the measurement values are recorded by means of a sensor system of a motor vehicle. Evaluation circuitry 22 is configured to identify an unusable measurement value at an error time. A processing circuitry 23 of the device 20 is configured to determine a vehicle spacing D for a current observation period, which contains the error time, based on a vehicle spacing determined from the recorded measurement values for a previous observation period. The determined vehicle spacing D is finally passed on via an output 25 for further processing. The processing circuitry 23 may be configured to consider a ratio of a duration of the current observation period to a duration of the previous observation period during determination of the vehicle spacing D. For example, for this purpose, the processing circuitry 23 scales the vehicle spacing determined for the previous observation period proportionally to said ratio. The current observation period and the previous observation period may have the same start time. This may additionally be adjustable.

The evaluation circuitry 22 and the processing circuitry 23 may be controlled by a control unit 24. If necessary, settings of the evaluation circuitry 22, the processing circuitry 23 or the control unit 24 can be changed by means of a user interface 27. The data, in particular the received measurement values $M_i$, accumulating in the device 20 can be saved in a memory 26 of the device 20 if required, for example for later evaluation or for use by the components of the device 20. The evaluation circuitry 22, the processing circuitry 23 as well as the control unit 24 may be realized as dedicated hardware, for example as integrated circuits. Of course, they may, however, also be partially or completely combined or implemented as software that runs on a suitable (micro)processor such as a GPU. The input 21 and output 25 can be implemented as separate interfaces or as a combined bidirectional interface.

Figure 3:
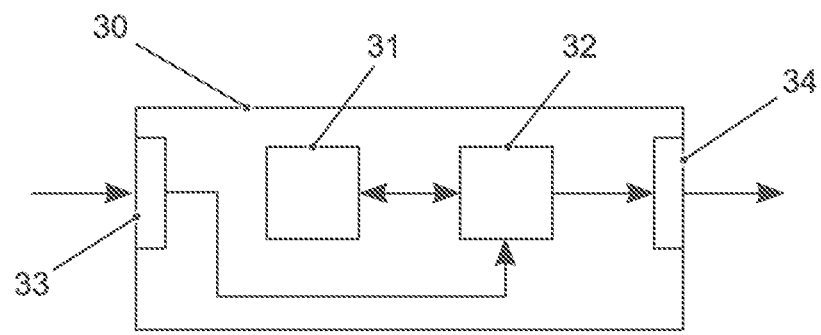
FIG. 3 shows a second embodiment of a device for determining a vehicle spacing for an observation period.

FIG. 3 shows a simplified schematic representation of a second embodiment of a device 30 for determining a vehicle spacing for an observation period. The device 30 comprises a processor 32 and a memory 31. For example, the device 30 is a computer, a workstation or a controller. Instructions are saved in the memory 31 that, when executed by the processor 32, cause the device 30 to execute the steps according to one of the described methods. The instructions saved in the memory 31 thus represent a program that can be run by the processor 32 and that is realized by the method according to the teachings herein. The device has an input 33 for receiving information. Data generated by the processor 32 is made available via an output 34. Moreover, said data can be saved in the memory 31. The input 33 and the output 34 can be combined into a bidirectional interface.

The processor 32 may comprise one or more processor units, for example microprocessors, digital signal processors or combinations thereof.

The memories 26, 31 in the described embodiments may have volatile and/or non-volatile memory areas and comprise various memory devices and memory media, for example hard drives, optical memory media or semi-conductor memories.

Both embodiments of the device can be integrated in the motor vehicle or be part of a back end connected to the motor vehicle.

Figure 4:
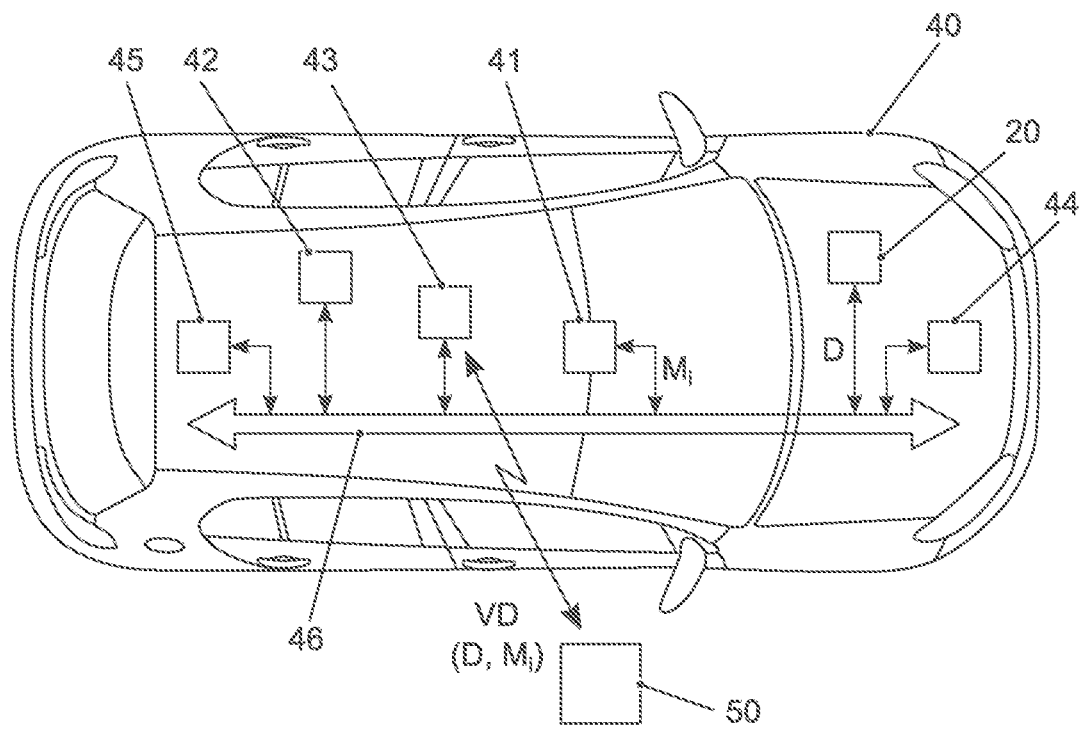
FIG. 4 schematically shows an embodiment of a motor vehicle in which a solution according to the present aspect is realized.

FIG. 4 schematically shows a motor vehicle 40 in which a solution according to the teachings provided herein is realized. The motor vehicle 40 comprises a sensor system 41 which detects the surroundings of the vehicle and the measurement values $M_i$ of which can be used to determine an average vehicle spacing. Other components of the motor vehicle 40 are a navigation system 42, a data transmission unit 43 and a series of assistance systems 44, one of which is shown here by way of example. By means of the data transmission unit 43, a connection can be established to a back end 50, in particular for transmitting recorded data. Data that are intended to be transmitted to a back end 50 can be obfuscated based on a vehicle spacing D determined by the device 20. In this case, obfuscated data VD is transmitted to the back end 50. Alternatively, the data may be obfuscated in the back end 50 before being made available thereby to a data user. In this case, the determined vehicle spacing D or the original measurement values $M_i$ can be transmitted to the back end 50 together with the data to be transmitted. A memory 45 is provided for storing data. The data is exchanged between the various components of the motor vehicle 40 via a network 46.

Figure 5:
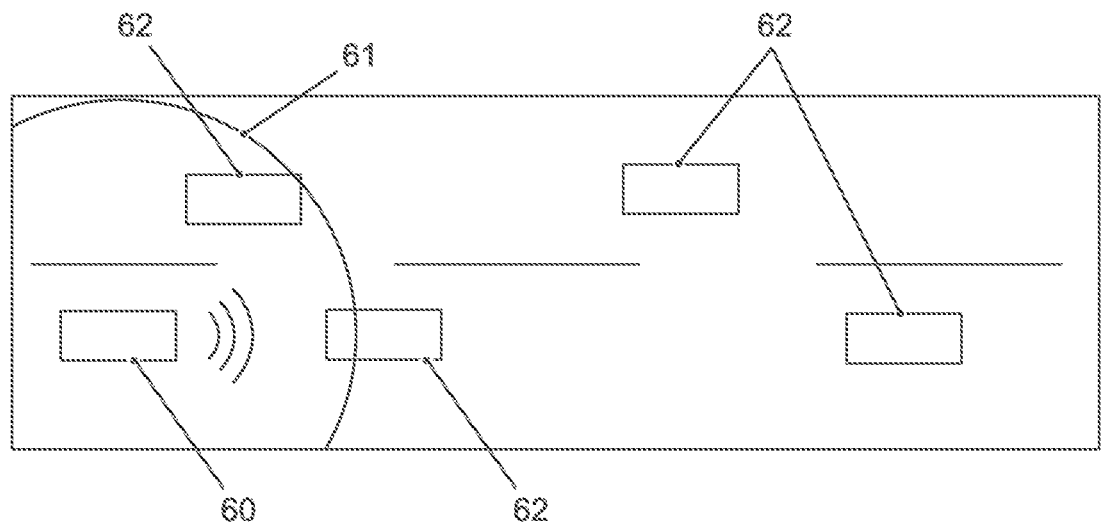
FIG. 5 illustrates a traffic situation at a first measurement time.

FIG. 5 illustrates a traffic situation at a first measurement time $t_1$. In particular, the average spacing between the vehicles 60, 62 is relevant for determining the traffic density at a given time. As shown in FIG. 5, the vehicle sensor system of the ego vehicle 60 can only provide information on spacings from vehicles 62 within a spatially restricted area determined by means of a detection range 61.

For the purpose of illustrating the solution approach, it shall be assumed here that at the measurement time $t_1$ a situation as in FIG. 5 exists and an average vehicle spacing of 100 m is measured.

Figure 6:
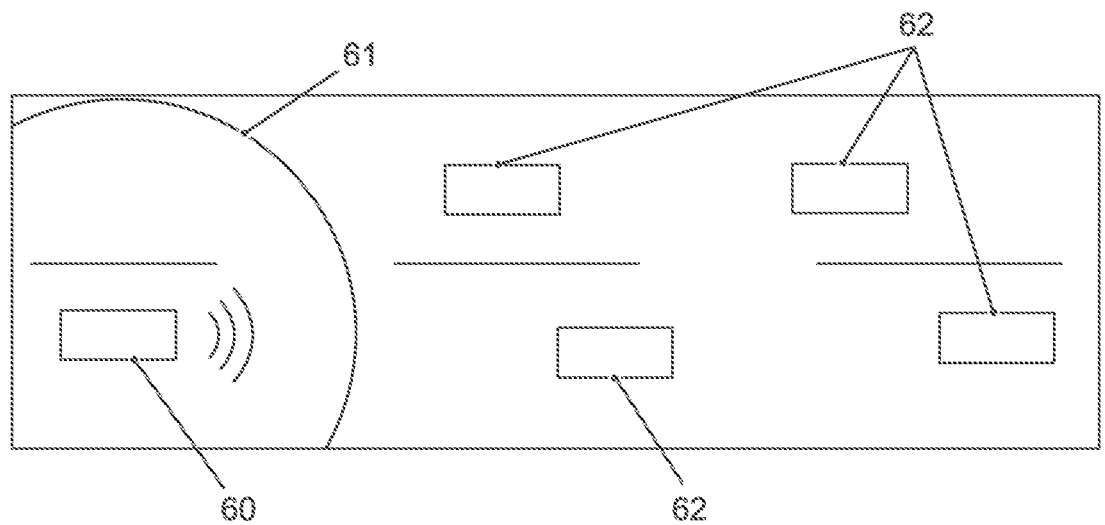
FIG. 6 illustrates a traffic situation at a second measurement time.

FIG. 6 illustrates the evolving traffic situation at the measurement time $t_6$. Previously detected vehicles are not outside the sensors' field of perception.

Data are extracted at the measurement times $t_1 < t_2 < t_3 < t_4 < t_5 < t_6$ with the following average spacings:

| Measurement time | Average spacing |
| --- | --- |
| $t_1$ | 100 m |
| $t_2$ | 110 m |
| $t_3$ | 150 m |
| $t_4$ | 250 m |
| $t_5$ | ∞ (no detection takes place) |
| $t_6$ | ∞ (no detection takes place) |

For the observation period $T=t_6-t_0$, where $t_0$ is the start time of the recording, the vehicle sensor system would therefore report that the vehicle spacing is infinite and thus the traffic density is zero. Accordingly, any other data recorded would have to be obfuscated to a significant degree. This equates to a devaluation of the data. The vehicle spacing is presently defined by the mean of the measurement values within the observation period, i.e., a vehicle spacing averaged over the observation period is determined.

However, if the observation period T is sufficiently small, the inference explained above is incorrect. Based on the spacings of finite length detected in the previous observation period $T'=t_4-t_0$, a corrected vehicle spacing D can be determined. For this purpose, the spacing D' calculated for the observation period T' can be scaled to the observation period T to a spacing of $$D = \frac{T}{T'} \cdot D' \qquad 1$$

The scaling factor is given by the ratio of the observation periods T/T'. Assuming that $t_0=0$, a spacing D'=(100 m+110 m+150 m+250 m)/4=152.5 m results for the values indicated in the table above for the observation period T'. A scaled spacing $D=T/T' \cdot 152.5$ m$=t_6/t_4 \cdot 152.5$ m is therefore calculated for the observation period T.

Typically, data points are extracted at a constant frequency from the vehicle, i.e. $t_1=i \cdot c$, with c>0. Therefore, the above formula can be generalized to $$D = k \cdot D' \qquad 2$$

where k is the number of measurement times since a start time divided by the number of measurement times with a finite measured average vehicle spacing.

For the above-mentioned measurement series, this therefore produces a scaled spacing D=6/4·152.5 m=228.75 m for the observation period T. For the observation period T''=$t_5$-$t_0$, D''=5/4·152.5 m=190.63 m results in a similar way. From these values, a traffic density other than zero can now be determined and thus high-quality anonymization of the vehicle data is possible.

LIST OF REFERENCE NUMBERS

10 Receiving measurement values for a plurality of measurement times
11 Storing the measurement values
12 Identifying an unusable measurement value
13 Determining a vehicle spacing for a current observation period based on a vehicle spacing determined for a previous observation period
20 Device
21 Input
22 Evaluation circuitry
23 Processing circuitry
24 Control unit
25 Output
26 Memory
27 User interface
30 Device
31 Memory
32 Processor
33 Input
34 Output
40 Motor vehicle
41 Sensor system
42 Navigation system
43 Data transmission unit
44 Assistance system
45 Memory
46 Network
50 Back end
60 Ego vehicle
61 Detection range
62 Vehicle
D Vehicle spacing
$M_i$ Measurement value
VD Obfuscated data The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for determining a vehicle spacing for an observation period, comprising:

detecting, using a sensor system of the ego vehicle, an average vehicle spacing for a plurality of measurement times, and providing data representing measurement values corresponding to the average vehicle spacing, wherein the measurement values are based on distances between the ego vehicle and vehicles within a detection range of a sensor system of the ego vehicle;

storing the data representing the measurement values in a memory;

retrieving, by evaluation circuitry, the data representing the measurement values;

identifying, by the evaluation circuitry, an unusable measurement value at an error time; and determining a scaled vehicle spacing for a current observation period, which contains the error time, based on scaling of a vehicle spacing determined from the recorded measurement values for a previous observation period.

2. The method of claim 1, wherein a ratio of a duration of the current observation period to a duration of the previous observation period is taken into consideration during determination of the scaled vehicle spacing for the current observation period.

3. The method of claim 2, wherein the scaled vehicle spacing determined for the previous observation period is scaled proportionally to the ratio of the duration of the current observation period to the duration of the previous observation period.

4. The method of claim 3, wherein the current observation period and the previous observation period have the same start time.

5. The method of claim 2, wherein the current observation period and the previous observation period have the same start time.

6. The method of claim 5, wherein the start time can be adjusted.

7. A non-transitory computer-readable medium comprising a program comprising instructions that, when executed by a computer, cause the computer to execute the steps of the method of claim 1.

8. The method of claim 1, wherein a ratio of a duration of the current observation period to a duration of the previous observation period is taken into consideration during determination of the scaled vehicle spacing for the current observation period.

9. A motor vehicle, configured to carry out a method of claim 1.

10. A back end for processing data recorded by a motor vehicle, configured to carry out a method of claim 1.

11. The method of claim 1, wherein an unusable measurement value is identified, in case of one or more of a measurement value being incorrect, a missing measurement values, and an infinite average vehicle spacing.

12. A device for determining a vehicle spacing for an observation period, comprising:

a sensor system for an ego vehicle and configured to detect an average vehicle spacing for a plurality of measurement times and to provide data representing measurement values corresponding to the average vehicle spacing, wherein the measurement values are based on distances between the ego vehicle and vehicles within a detection range of a sensor system of the ego vehicle;

a memory, connected with the sensor system and configured to store the data representing the measurement values;

evaluation circuitry, connected with the memory and configured to retrieve the measurement values and to identify an unusable measurement value at an error time; and a processing circuitry, configured to determine a scaled vehicle spacing for a current observation period, which contains the error time, based on scaling of a vehicle spacing determined from the recorded measurement values for a previous observation period.

13. A motor vehicle comprising a device of claim 12.

14. A back end for processing data recorded by a motor vehicle comprising a device of claim 12.

15. The device of claim 12, wherein an unusable measurement value is identified, in case of one or more of a measurement value being incorrect, a missing measurement values, and an infinite average vehicle spacing.

16. A method for determining a vehicle spacing for an observation period, comprising:

detecting, using a sensor system, measurement values relating to an average vehicle spacing for a plurality of measurement times;

storing the measurement values in a memory;

identifying an unusable measurement value at an error time; and determining a vehicle spacing for a current observation period, which contains the error time, based on a vehicle spacing determined from the recorded measurement values for a previous observation period; wherein a ratio of a duration of the current observation period to a duration of the previous observation period is taken into consideration during determination of the vehicle spacing for the current observation period.

17. A device for determining a vehicle spacing for an observation period, comprising:

a sensor system for determining measurement values relating to an average vehicle spacing for a plurality of measurement times;

a memory for storing the determined measurement values;

evaluation circuitry for identifying an unusable measurement value at an error time; and a processing circuitry for determining a vehicle spacing for a current observation period, which contains the error time, based on a vehicle spacing determined from the recorded measurement values for a previous observation period; wherein a ratio of a duration of the current observation period to a duration of the previous observation period is taken into consideration during determination of the vehicle spacing for the current observation period.

* * * * *